United States Patent [19]

Suzuki et al.

[11] Patent Number: 4,663,976
[45] Date of Patent: May 12, 1987

[54] ELECTROMAGNETIC FLOWMETER

[75] Inventors: Kazuie Suzuki; Takashi Torimaru; Hironobu Ohta, all of Tokyo, Japan

[73] Assignee: Yokogawa Hokushin Electric Corporation, Tokyo, Japan

[21] Appl. No.: 753,396

[22] Filed: Jul. 10, 1985

[51] Int. Cl.$^4$ .................................. G01F 1/60
[52] U.S. Cl. .................. 73/861.12; 361/154
[58] Field of Search .......... 73/861.12, 861.16, 861.17; 361/152, 153, 154, 155, 156

[56] References Cited

U.S. PATENT DOCUMENTS

| | | | |
|---|---|---|---|
| 3,996,797 | 12/1976 | Torimaru et al. | 73/861.16 |
| 4,204,240 | 5/1980 | Schmoock | 361/152 |
| 4,373,400 | 2/1983 | Sekiguchi | 73/861.12 |
| 4,462,060 | 7/1984 | Schmoock | 73/861.12 |
| 4,488,438 | 12/1984 | Tomita | 73/861.12 |
| 4,563,904 | 1/1986 | Geisler | 73/861.12 |

Primary Examiner—Herbert Goldstein
Attorney, Agent, or Firm—Moonray Kojima

[57] ABSTRACT

An electromagnetic flowmeter using an exciting current of a rectangular wave form supplied to an exciting coil for excitation, wherein a DC voltage produced by rectifying a frequency power source, is applied by way of a voltage regulating circuit to an exciting circuit, and a switching device is connected in series between the exciting circuit and the voltage regulating circuit and is controlled by a DC reference voltage determining the level of the exciting voltage and a timing signal determining the switching timing for the exciting current. The invention enables accurate and rapid control of the waveform of the exciting current, reduces costs, and can be used for different voltages without any substantial change of circuitry.

17 Claims, 9 Drawing Figures

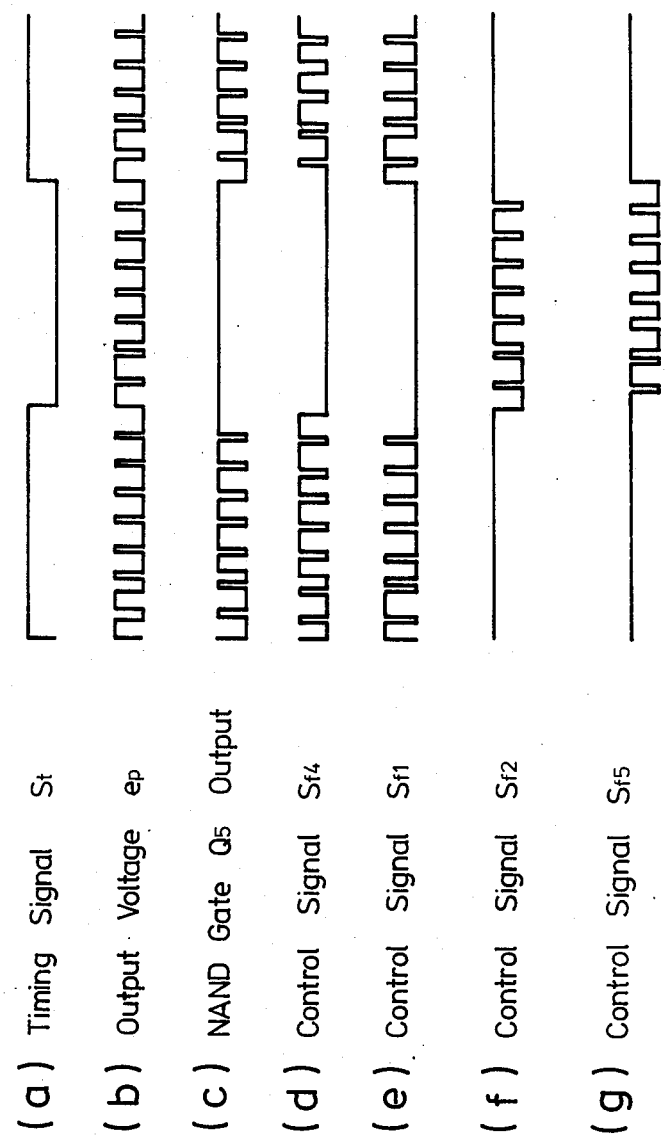

ELECTROMAGNETIC FLOWMETER

BACKGROUND OF THE INVENTION

1. Field of Invention

This invention relates to an electromagnetic flowmeter which uses an exciting current of rectangular waveform supplied to an exciting coil for excitation and, more particularly, to an exciting circuit for such an electromagnetic flowmeter, wherein the duty ratio of current pulses for the ON-OFF control of the exciting current is varied to form a constant exciting current.

2. Discussion of Prior Art

In conventional electromagnetic flowmeters, an alternating voltage at a commercial frequency is applied as it is to an exciting coil, for eliminating the effect of the polarization voltage produced between electrodes, and the resulting magnetic field at the commercial frequency is applied to a fluid being measured. Then the flow rate is detected depending on the alternating voltage produced between the electrodes in contact with the fluid to be measured.

However, there is a limit to the measurement of the flow rate at high accuracy in the electromagnetic flowmeter of this type of excitation system, since induced noises result due to the fluctuation in the magnetic field and vary the zero point.

In view of the above situation, there is also employed an excitation system using an AC current at a lower frequency than the above discussed excitation current applied to the excitation coil for avoiding the effect of the polarization, and converting the form of the excitation current into a rectangular waveform having a period in which the level of the current does not change, and sampling the signal voltage during this period so that the effect of the induced noises may be eliminated.

There are also known various types of excitation systems using lower frequency wave having a rectangular waveform for excitation. One example is described in U.S. Pat. No. 4,462,060.

In the excitation system of U.S. Pat. No. 4,462,060, a commercial AC is applied, after full wave rectification, to a pair of switching elements connected in series with an excitation coil. The switching elements are controlled by a duty cycle converter, including a comparator, that varies the duty cycle corresponding to the value of the excitation current, to maintain the exciting current constant. On the other hand, a gate voltage at a low frequency and having a waveform analogous to that of a desired exciting current is applied to the duty cycle converter to obtain an exciting current of low frequency and having a rectangular waveform whose flat portion is maintained constant.

However, since the level and the waveform of the excitation current are dependent on the level and the waveform of the gate voltage in this type of excitation system, disadvantageously, such level and waveform have to be maintained exactly and control thereof is difficult.

Further, disadvantageously, the voltage obtained through the full wave rectification of the commercial AC voltage is applied as it is to the excitation coil by way of a control circuit for controlling the exciting current. Thus, the system is strictly limited to the power source for which it is designed. For example, the system may be limited to 110 V, and cannot be used for 220 V, in view of the dynamic range of the control circuit.

SUMMARY OF THE INVENTION

Accordingly, an object of the invention is to overcome the aforementioned and other disadvantages and deficiencies of the prior art.

Another object is to provide means capable of controlling the waveform of the exciting system current in a simple circuit, without controlling the waveform of the exciting current, by a voltage of a waveform analogous to that of the excitation current.

A further object is to provide a general purpose excitation system of applying a voltage obtained through rectification of a commercial voltage to the control circuit for the exciting current by way of a switching circuit.

A still further object is to provide an exciting circuit of rapid response and high efficiency.

The foregoing and other objects are attained by the invention wherein a commercial AC voltage is subjected to a full wave rectification and a voltage regulated DC voltage obtained by way of a switching circuit is applied to an exciting circuit including an exciting coil controlled by a control circuit for controlling the exciting current. In this exciting circuit, a first switching element and a detecting resistor for detecting the exciting current are connected in series with the exciting coil. A second switching element for supplying an exciting current in the opposite direction is connected in parallel with the serial circuit comprising the exciting coil and the detecting resistor. On the other hand, the control circuit detects the value of the exciting current as a feedback voltage generated across the detection resistor, generates an absolute value thereof, takes a difference between the absolute value and a reference voltage determining the level of the exciting current, converts the difference into a train of pulses with varying duty ratio, and thereafter, switching the train of pulses by a timing signal for switching the exciting current, to control the first and second switching element.

BRIEF DESCRIPTION OF DRAWING

FIG. 9, comprising lines (a) through (g) is a waveform chart depicting operation of the embodiment of FIG. 8.

DETAILED DESCRIPTION OF PREFERRED EMBODIMENTS

Figure 1:
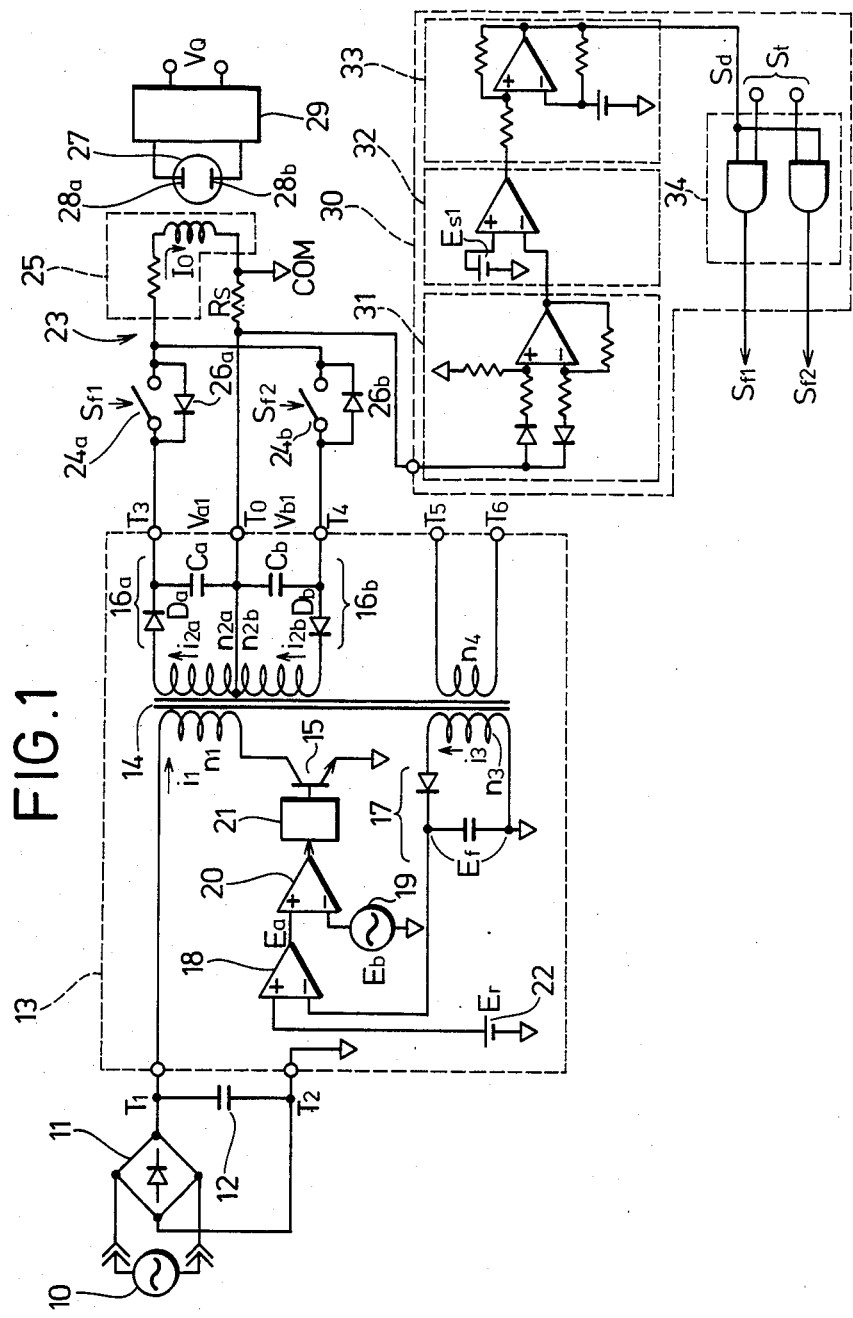
FIG. 1 is a block diagram depicting an illustrative embodiment of the invention.

Turning to FIG. 1, a voltage across the terminals of a commercial power source 10, is subjected to full wave rectification in a rectifier 11. A DC voltage, after full wave rectification, is filtered in a capacitor 12 and then applied by way of terminals T1, T2 to a switching circuit 13.

Switching circuit 13 comprises a transformer 14, a transistor 15 as a switching element, rectifying and smoothing circuits 16a,16b, 17, an error amplifier 18, an oscillator 19 outputting a triagonal waveform voltage, a comparator 20, a switching element drive circuit 21 and a reference voltage source 22 for generating a reference voltage Er. The transformer 14 includes primary windings n1, secondary windings n2a, n2b, tertiary windings n3 and quarternary windings n4.

The voltage from power source 10 is applied by way of smoothing capacitor 12 to a serial circuit comprising primary windings n1 and transistor 15. When transistor 15 is turned ON, a primary current i1 flows. When transistor 15 is turned OFF, energy stored in the core of transformer 14 by primary current i1 is discharged as secondary currents i2a, i2b and a tertiary current i3, to the side of secondary windings n2a, n2b and tertiary windings N3. Secondary currents i2a, i2b are smoothed through first and second rectifying and smoothing circuits 16a,16b and applied to exciting circuit 23 for an electromagnetic flowmeter, to supply an exciting current Io.

On the other hand, tertiary current i3 on the side of tertiary windings n3 is rectified and filtered through rectifying and smoothing circuit 17 into a feedback voltage Ef, which is applied to the inverted terminal (−) of errror amplifier 18.

Error amplifier 18, having a set voltage Er applied to the non-inverted input terminal (+), amplifies the difference between reference voltage Er and feedback voltage Ef. The output Ea from amplifier 18 is compared with a trigonal waveform voltage Eb from oscillator 19 in comparator 20. Based on the results of the comparison, drive circuit 21 turns transistor 15 either to ON or OFF. In this manner, transistor turns ON and OFF, repeatedly so as to attain the state Ef=Er, to keep constant outputs Va1, Vb1 and the output voltage across terminals T5 and T6 of switching circuit 13.

First rectifying and smoothing circuit 16a, comprising diode Da and a smoothing capacitor Ca, rectifies and filters the voltage produced across secondary windings n2a of transformer 14, to obtain a positive DC voltage Va1 between terminals T3 and T0.

Second rectifying and smoothing circuit 16b, comprising a diode Db and a smoothing capacitor Cb, rectifies and filters the voltage produced across secondary windings n2b of transformer 14, to obtain a negative DC voltage Vb1 between terminals T4 and T0.

The two ends of quarternary windings n4 are connected to terminals T5,56, respectively, and the voltage produced across the two ends, is used as a power supply for other circuits in the electromagnetic flowmeter.

Between terminals T3 and T0, are connected in series a switch 24a, an exciting coil 25 and a detection resistor Rs for detecting the exciting current Io. The junction between exciting coil 25 and detection resistor Rs is connected to a common potential point COM. Between terminals T4,T0 are connected in parallel a serial circuit comprising exciting coil 25 and detection resistor Rs by way of switch 24b. Switches 24a, 24b are connected in parallel with diodes 26a, 26b, respectively, by which the energy stored in exciting coil 25 is caused to be absorbed in capacitors Cb, Ca when the switches 24a, 24b are turned OFF, respectively. Switches 24a,24b are opened and closed by control signals Sf1, Sf2, respectively.

Switches 24a, 24b, exciting coil 25, detection resistor Rs, diodes 26a, 26b, etc, may be considered to constitute an exciting circuit 23 for the flowmeter.

A magnetic field is produced by an exciting current Io flowing through exciting coil 25. The magnetic field is applied to a conduit 27 in which fluid to be measured is filled. Conduit 27 is disposed with a pair of grounded electrodes 28a,28b and a voltage generated across the two electrodes is outputted by way of a signal processing circuit 29 as a flow rate signal Va.

The voltage between detection resistor Rs and common potential point COM is inputted to a control circuit 30 for controlling exciting current Io. Control circuit 30 comprises an absolute value circuit 31, a difference amplifier 32, a duty cycle oscillation circuit 33 and a mathematical operation circuit 34.

The voltage produced by exciting current Io flowing through detection resistor Rs is inputted into absolute value circuit 31. The voltage inputted to absolute value circuit 31 is applied in the form of its absolute value to one input of difference amplifier 32. A DC reference voltage Es1 is applied to the other input of the difference amplifier 32. As a result, a voltage corresponding to the difference between the reference voltage Es1 and the absolute value for the voltage across the detection resistor Rs is outputted at the output terminal of difference amplifier 32. The output terminal of the difference amplifier 32 is connected to the input terminal of duty cycle oscillation circuit 33. The output terminal of circuit 33 is connected to the input terminal of mathematical operation circuit 34.

Operation circuit 34 is supplied with control signal Sd from circuit 33 and a timing signal St, and calculates the product between signal St and control signal Sd. Operation circuit 34 outputs control signals Sf1, Sf2, which control the opening and closing of switches 24a,24b, respectively.

Figure 2:
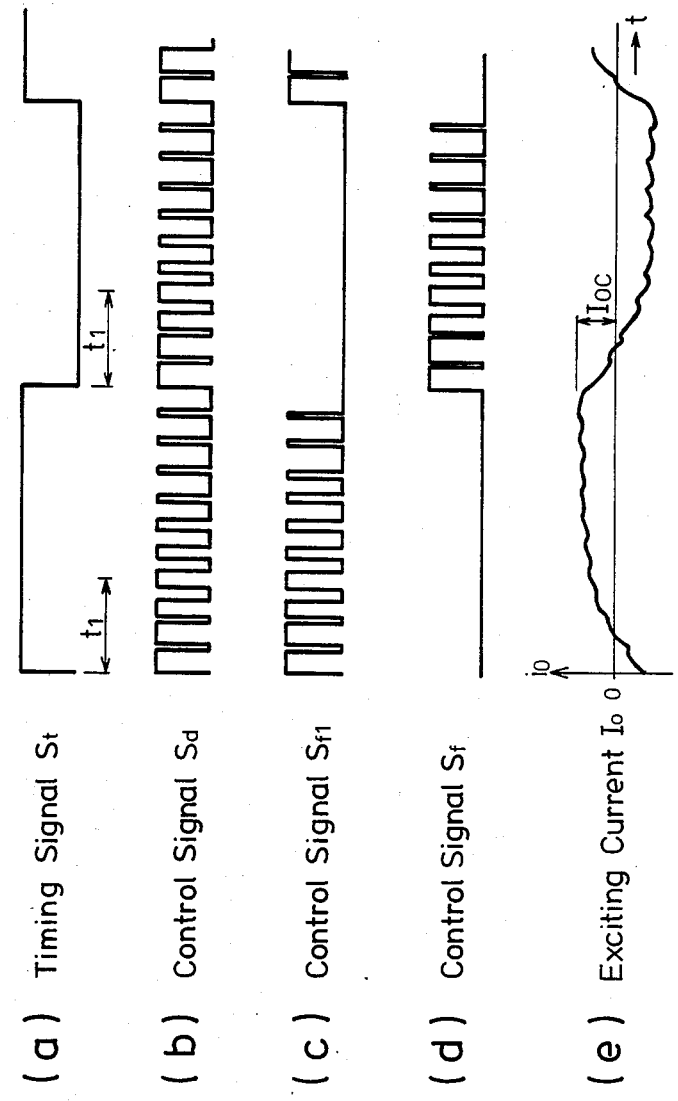
FIG. 2, comprising lines (a) through (e) is a waveform chart depicting the waveform in each section of the FIG. 1 embodiment.

Operation of the circuit of FIG. 1 will now be described with reference to the waveform chart of FIG. 2. Switch 24a or 24b is closed by control signal Sf1 or Sf2, to supply exciting current Io to exciting coil 25. Exciting current Io is detected by detection resistor Rs and then inputted into absolute value circuit 31. The difference between the output from the absolute value circuit 31 and a predetermined reference voltage Es1 is amplified in and outputted from difference amplifier 32. Since the absolute value of the exciting current is relatively small due to the inductance L of exciting coil 25 during the transient period t1 after the exciting current Io has been switched by timing signal St (FIG. 2, line a), the output from difference amplifier 32 is made greater, in which case, control signal Sd from duty cycle oscillation circuit 33 takes the waveform of a train of pulses having a longer ON period (FIG. 2, line b). As exciting current Io approaches a constant current value Ioc (FIG. 2, line e), the output from difference amplifier 32 becomes smaller, in which case, control signal Sd takes the waveform of a train of pulses having shorter ON period (FIG. 2, line b).

Operation circuit 34 performs an arithmetic operation and obtains a logic product between control signal Sd (FIG. 2, line b) from duty cycle oscillation circuit 33 and timing signal St that gives the timing for the exciting current (FIG. 2, line a) and generates control signal Sf1 or Sf2 (FIG. 2, lines c, or d). Each of switches 24a,24b is controlled by control signal Sf1 or Sf2, respectively.

When switch 24a or 24b is opened or closed by the duty cycle, as shown in FIG. 2, lines c or d, the average exciting voltage applied to exciting coil 25 is increased during the transient period t1 of the exciting current Io (FIG. 2, line a) to make the rise of exciting current Io faster (FIG. 2, line e). Even when switch 24a or 24b is switched, exciting current Io is smoothed due to the inductance of exciting coil 25 to form exciting current Io varying at a low frequency (FIG. 2, line e). Exciting current value Ioc, at which exciting current Io, is settled constant, can be determined by adjusting reference voltage Es1 or difference amplifier 32.

As can be seen from the above description, since the flat portion of exciting current Io can be determined by reference voltage Es1, which is a constant DC voltage, and since the switching of exciting current Io can be determined by merely applying timing signal St, the waveform of exciting current Io can readily be determined by reference voltage Es1 and timing signal St. Accodingly, in this embodiment, the waveform of exciting current Io can be controlled by a simple circuit with no requirement for preparing a control signal analogous to the level and the waveform of the exciting current used in the prior art as described above.

Furthermore, according to this embodiment, advantageously, since the commercial AC voltage is subjected to an efficient voltage control through switching circuit 13 and is applied to exciting circuit 23, it is capable of operating without requiring any substantial modification, even though voltage ratio of the power source is changed, such as from 110 v to 220 v.

Furthermore, according to this embodiment, since the voltage resulting between terminals T5 and T6, can be used in common with other circuit power supplies in the flowmeter, the invention is advantageously simple and does not require providing any exclusive power supply section for the exciting circuit, such as required in prior art circuits as described above.

Figure 3:
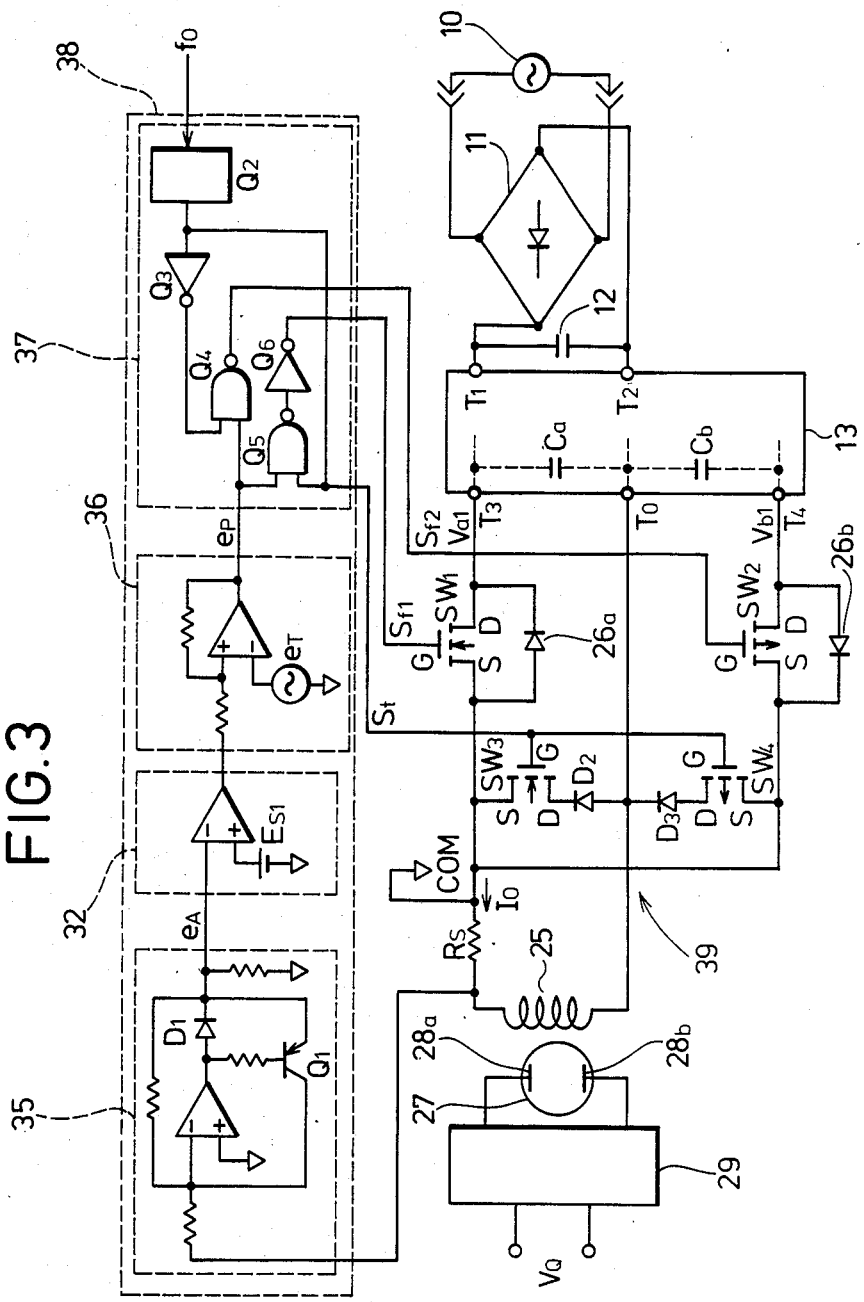
FIG. 3 is a block diagram depicting another illustrative embodiment of the invention.

Turning now to FIG. 3, which depicts another illustrative embodiment of the invention, these portions having the same functions as those constituent elements shown in FIG. 1 carry the same reference numerals. The common components are omitted from the description for sake of clarity.

A voltage produced upon flowing of the exciting current Io through detection resistor Rs is inputted to an absolute circuit 35. Absolute circuit 35 calculates the absolute value for the input voltage by conducting a transistor Q1 when the input voltage is positive and conducting a diode D1 when it is negative.

A difference amplifier 32 amplifies the difference between the output eA from absolute value circuit 35 and the reference voltage Es1 and outputs the amplified difference to a duty cycle conversion circuit 36.

The duty cycle conversion circuit 36 compares the output from difference amplifier 32 with a trigonal waveform voltage eT at a high frequency and outputs a voltage eP of a train of pulses whose duty cycle is in proportion to the output from difference amplifier 32 to an operation circuit 37.

In operation circuit 37, a power source signal of frequency f0 is supplied to frequency divider Q2, for example, which frequency divides the signal into a lower frequency to obtain a timing signal St. The timing signal St is inputted, by way of an inverter Q3, to a NAND gate Q4. An output voltage eP, from duty cycle conversion circuit 36, is applied to the other input terminal of NAND gate Q4 and a control signal SF2 is generated at the output thereof. Timing signal St from divider Q2 and output voltage eP from duty cycle conversion circuit 36 are inputted to a NAND gate Q5, the output of which is outputted through an inverter Q6 as a control signal Sf1.

Absolute value circuit 35, difference amplifier 32, duty cycle conversion circuit 36 and operation circuit 37 may be considered to constitute a control circuit 38, which outputs timing signal St and control signals, Sf1, Sf2, to an exciting circuit 39 as described hereinbelow.

The exciting circuit 39 is supplied with a positive DC voltage Va1 and a negative DC voltage Vb1 from a switching circuit 13 and supplies an exciting current Io to an exciting coil 25 under the control of timing signal St and control signals Sf1, Sf2 from control circuit 38. Terminal T3 of switching circuit 13 is connected with a drain D to a switching element SW1 comprising an N-channel field effect transistor (MOS-FET) The source S of the FET is connected wtih one end of detection resistor Rs and to a common potential point COM. The other end of resistor Rs is connected to one end of exciting coil 25. A diode 26a is connected between drain D and source S of switching element SW1 with the cathode thereof being on the side of terminal T3. Gate G of switching element SW1 is connected with the output terminal of inverter Q6 of operation circuit 37.

Terminal T4 of switching circuit 13 is connected with drain D of switching element SW2 comprising a P-channel field effect transistor (MOS-FET). Source S of the FET of SW2 is connected with the sources S of switching elements SW4,SW3 and SW1. A diode 26b is connected between drain D and source S of the switching element SW2 with the anode thereof being on the side of terminal T4. Gate G of switching element SW2 is connected with the ouput terminal of NAND gate Q4 of operation circuit 37.

Terminal T0 of switching circuit 13 is connected to another end of exciting coil 25. Between terminal T0 and source S of element SW1, are connected in series a switching element SW3, comprising an N-channel field effect transistor (MOS-FET) and a diode D2 with the anode thereof being on the side of terminal T0, to comprise a switching circuit, in which gate G of switching element SW3 is connected with the output terminal of frequency divider Q2 of operation circuit 37.

In the same manner, between terminal T0 and switching element SW2, are connected in series a switching element SW4, comrprising a P-channel field effect transistor (MOS-FET) and a diode D3 with the cathode thereof being on the side of terminal T0, to comprise another switching circuit, in which gate G of switching element SW4 is connected with the output terminal of frequency divider Q2 of operation circuit 37, in the same manner as the gate of switching element SW3.

The operation of the circuit of FIG. 3 will now be described with reference to the waveforms of FIG. 4. Corresponding to the timing signal St at a low frequency (FIG. 4, line a) generated by frequency dividing power source frequency F0 in frequency divider Q2, an exciting current Io (FIG. 4, line b) is caused to flow and is detected by detection resistor Rs. It is then formed into an absolute value thereof (FIG. 4, line c) in absolute value circuit 35 and then inputted, by way of difference amplifier 32, to duty cycle conversion circuit 36. This input is compared with the trigonal waveform voltage eT (FIG. 4, line d) in duty conversion circuit 36 and outputted as an output voltage eP (FIG. 4, line e) in proportion to the level of output voltage eA from absolute value circuit 35.

Figure 4:
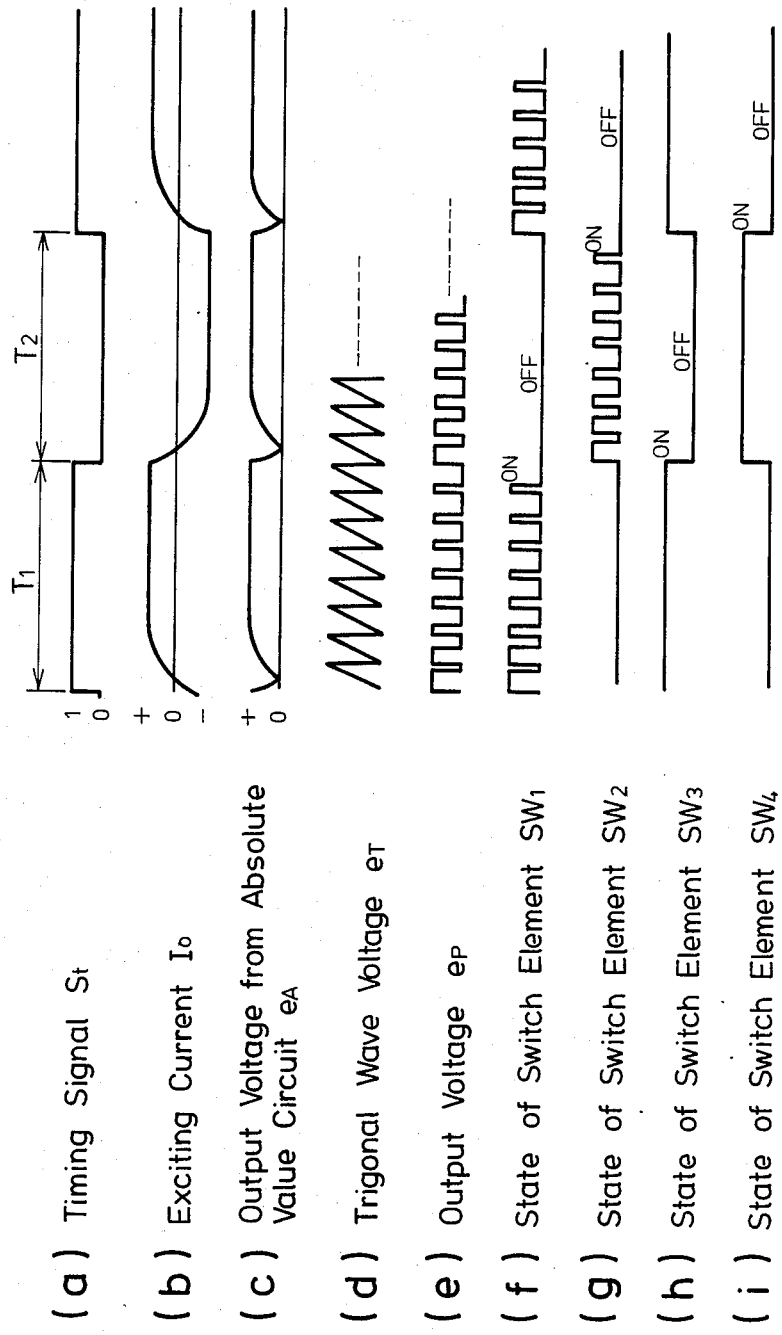
FIG. 4, comprising lines (a) through (i) is a waveform chart depicting the waveform in each section of the FIG. 3 embodiment.

Switching element SW1 is opened and closed by control signal Sf1 generated by taking a NAND operation between output voltage eP and timing signal St, and further inverting it in inverter Q6 (FIG. 4, line f). Where the absolute value of exciting current Io is relatively small, the ON period of switching element SW1 is increased to make the rise of exciting current Io faster. Furthermore, switching element SW2 is opened and closed by control signal Sf2 which is generated by a NAND operation in NAND gate Q4, between timing signal St which is inverted in inverter Q3 and output voltage eP (FIG. 4, line g).

Also, in switching element SW2, where the absolute value of exciting current Io is relatively smaller, the ON period of switching element SW2 is increased to make the rise of the exciting current Io faster.

Timing signal St (FIG. 4, line a) is applied to each of gates G of switching elements SW3, SW4, in which switching element SW3 is turned ON when gate G is in a positive period (logic 1) (FIG. 4, line h), while switching element SW 4 is turned ON when gate G is in the 0 period (logic 0) (FIG. 4, line i).

Accordingly, in period T1 where timing signal St is at a positive level (FIG. 4, line a), switching element SW1 turns ON and OFF repeatedly and produces a train of pulses at high frequency. In each ON period, exciting current Io is supplied to exciting coil 25 by positive DC voltage Va1. On the other hand, if element SW1 is turned OFF, a current flows through diode D2, switching element SW 3 is in the ON state and detection resistor Rs, due to electromagnetic energy stored in exciting coil 25 and the current continues to flow until the next turning ON of the switching element SW1. Then, when element SW1 is turned ON, exciting current Io is again supplied by positive DC voltage Va1 and continuously flows as exciting current Io. The amplitude of exciting current Io is generated by duty cycle determined by reference voltage Es1.

Upon switching to period T2 when timing signal St turns to zero (FIG. 4, line a), switching element SW 3 is turned OFF in synchronism with the switching of timing signal St. In this instance, exciting current Io, having flowed through exciting coil 25, flows through diode 26b (FIG. 3) to capacitor Cb in switching circuit 13, to accumulate electrical charges therein, by which the voltage across terminal T0 and T4 is increased to make the rise of exciting current Io faster upon switching.

Then, after the inversion of the timing signal St (period T2), switching element SW2 turns ON and OFF repeatedly producing a train of pulses at high frequency and switch SW4 is also turned ON. In this state, the excitation in the negative direction is attained in the same manner as the excitation in the positive direction as described above.

As shown by the embodiment of FIG. 3, in which switching elements SW1–SW4 of the exciting circuit comprise enhancement type of MOS transistors, short circuiting of the power source can be prevented by using a control signal for each of the switching elements in a simple logic circuit while taking the common potential point COM as the reference potential.

Figure 5:
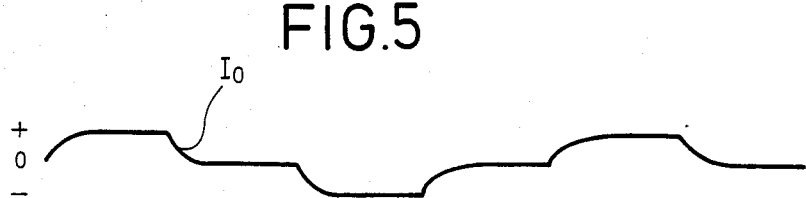
FIG. 5 is a waveform chart depicting the waveform of the exciting current using tristate excitation.
Figure 6:
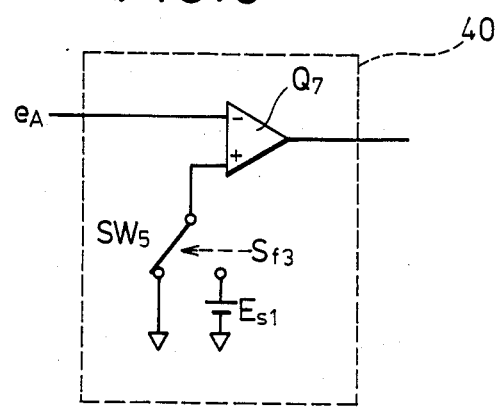
FIG. 6 is a circuit diagram depicting a difference amplifier for obtaining the exciting current shown in FIG. 5.

The waveform for the exciting current Io depicted in FIG. 5 shows the case of a tristate excitation wherein a non-excited state is present between the positive excitation and the negative excitation. Such an exciting current can be obtained by replacing the reference amplifier 32, depicted in FIG. 3, with a reference amplifier 40 depicted in FIG. 6.

The three state excitation can be attained by switching the voltage on the non-inverted input terminal of an operational amplifier Q7 with a switching element SW5 between reference voltage Es1 and zero volt by a control signal Sf3 which has a frequency twice as high as the exciting frequency. Since the value for the exciting current is set to zero in the case of the switching to the zero volt switching, tristate excitation, that is, positive, negative and zero excitation can be readily carried out in this circuit.

Figure 7:
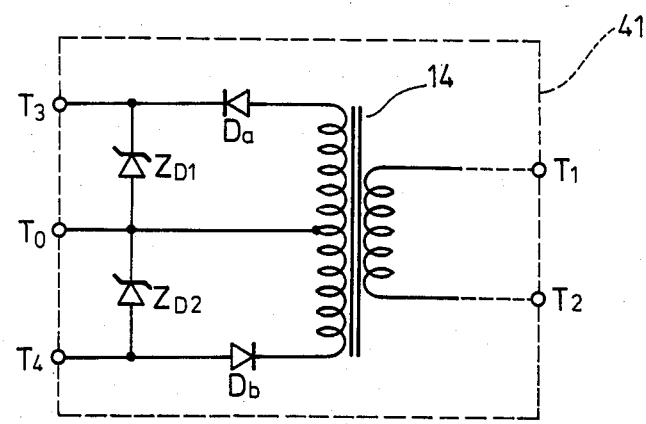
FIG. 7 is a circuit diagram depicting a circuit wherein Zener diodes are used instead of smoothing capacitors as in FIG. 1.

FIG. 7 is a circuit diagram depicting an actual embodiment of the switching circuit, wherein switching circuit 41 uses Zener diodes ZD1, Zd2, instead of capacitors Ca,Cb in switching circuit 13 of FIG. 1. In this circuit, the current flowing through Zener diodes ZD1, ZD2 upon inversion of polarity for the exciting current, results in a power loss. However, since the ripples in the power supply at the output of transformer 14 is smoothed due to the inductance of exciting coil 25, exciting current Io can be smoothed without capacitors Ca, Cb and the exciting current Io as shown in FIG. 2, line 5 or in FIG. 5, can be obtained in the same manner.

Figure 8:
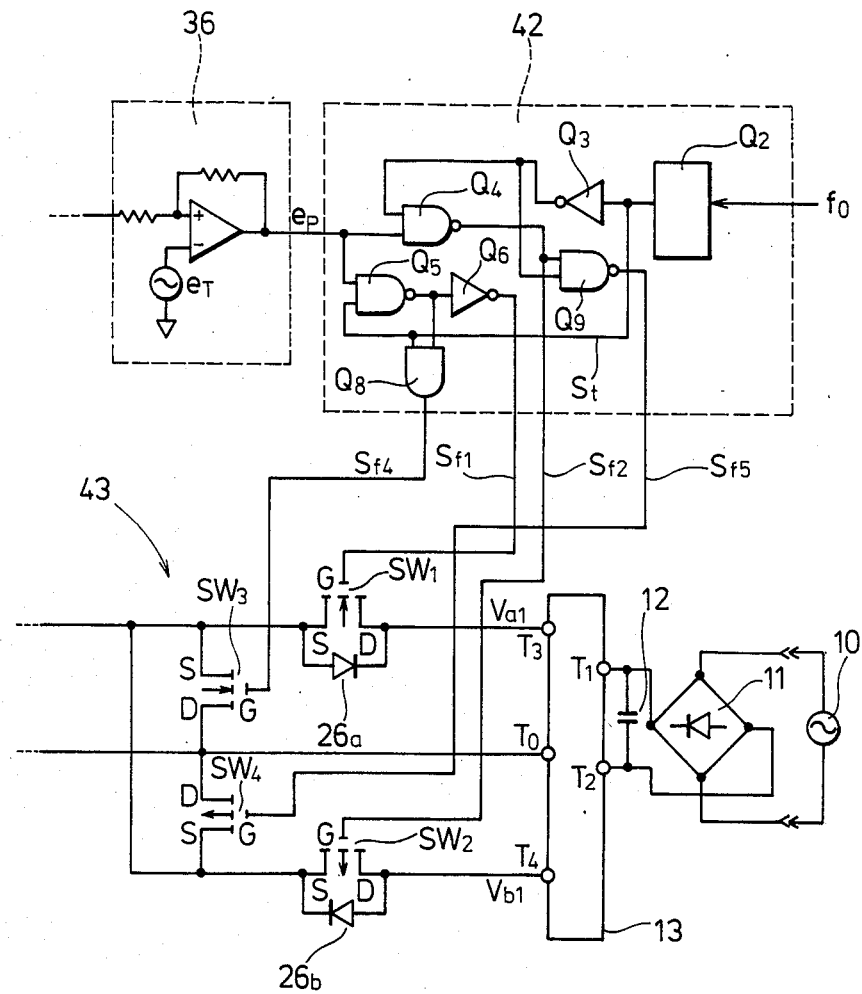
FIG. 8 is a circuit diagram depicting a portion of a further illustrative embodiment of the invention.

FIG. 8 is a block diagram wherein diodes D2, D3 of the exciting circuit of FIG. 3, are removed. In operation circuit 42, an AND gate Q8 and a NAND gate Q9 are disposed in addition to the other elements of operation circuit 37 (of FIG. 3). The output terminal of frequency divider Q2 and the output terminal of NAND gate Q5 are connected to the input terminal of AND gate Q8. The output terminal of gate Q8 is connected to gate G of element SW3 for applying a control signal Sf4. The output terminal of NAND gate Q4 and the output terminal of inverter Q3 are connected to the input terminals of NAND gate Q9. The output terminal of gate Q9 is connected to gate G of element SW4 for applying a control signal Sf5.

On the other hand, excitation circuit 43 has the same circuitry as that of exciting circuit 39 (of FIG. 3) described above except that both of switching elements SW3 and SW4 are directly connected in parallel with the serial circuit comprising the exciting coil 25 and detection resistor Rs.

The operation of the embodiment shown in FIG. 8 will now be described with reference to the timing chart of FIG. 9. A logic operation is undertaken in NAND gate Q5 for timing signal St as the output from frequency divider Q2 (FIG. 9, line a) and output voltage eP from duty cycle conversion circuit 36 (FIG. 9 line b) to obtain the waveform shown in FIG. 9, line c. A NAND operation is undertaken in NAND gate Q8 for timing signal St and the output from the NAND gate Q5, to obtain a control signal Sf4 shown in FIG. 9, line d, to thereby control switching element SW3.

On the other hand, the output from NAND gate Q5 is inverted in inverter A6 to obtain a control signal Sf1, to thereby control the switching element SW1.

Accordingly, when switching element SW1 is turned ON at high frequency, switching element SW3 is turned OFF. On the other hand, when switching element SW1 is turned OFF at high frequency, switching element SW3 is turned ON, in which case, the excitation energy in exciting coil 25 can flow through switching element SW3. Thus, diode D2 in FIG. 3 can be omitted. On the other hand, since switching elements SW2, SW4 also operate in a manner complementary to switching elements SW1, SW3, as can be seen from the waveforms shown in FIG. 9, lines f and g, the switching elements conduct the same operation, whereby diode D3 can be omitted.

The invention produces many advantages and effects. For example since the exciting current can be switched mereby by applying the switching timing by the timing signal St, and the level of the exciting current can be determined by the DC reference voltage Es1, the waveform for the exciting current can be controlled with higher accuracy, as compared with the prior art.

Also, advantageously, since a power source voltage is applied to the exciting current by means of the switching circuit which is capable of voltage control, the device can be connected to power source of different voltage levels, as it is without any modification. Thus, an easy to handle excitation circuit is attained.

Furthermore, since the power source for the exciting circuit of the invention is obtained by means of the switching circuit, the power supply for the exciting circuit can advantageously be used in common with other circuit power supplies in the flowmeter, and the circuitry of the power supply source section can advantageously be simplified, thereby to reduce costs.

Moreover, since the power source voltage is chopped at a high frequency so that a current flowing through the inductance of the exciting coil can be maintained during turning OFF of the switching element, the use of a high voltage rated capacitor is no longer necessary, which, advantageously, contributes to reduced costs.

Furthermore, since the exciting current flowing in the exciting coil is caused to flow into the capacitor of the power supply with the opposite polarity upon switching of the polarity of the exciting current, to thereby increase the voltage across the capacitor, the rise of the exciting current upon switching can be made faster, which contributes to improvement in response speed and energy savings.

The foregoing description is illustrative of the principles of the invention. Numerous extensions and modifications thereof would be apparent to the worker skilled in the art. All such extensions and modifications are to be considered to be within the spirit and scope of the invention.

What is claimed is:

1. An electromagnetic flowmeter comprising
a conduit (27);
a pair of electrodes (28a,28b) disposed in said conduit (27) at diametrically opposing positions;
an electromagnet disposed adjacent said conduit (27) and having an exciting coil (25) for generating a magnetic field within said conduit (27);
a driving means (13 etc) connected to said exciting coil (25) for exciting said electromagnet;
control means (30) connected to said driving means for controlling the driving means; and
detecting means (29) connected to said electrodes in said conduit (27) for detecting a flow rate signal (Va) generated by a fluid flowing through said conduit;
wherein said driving means comprises
a voltage regulator means (13) supplied with a DC voltage obtained by rectifying a voltage from an AC power source (10) having a predetermined frequency and applying a voltage control, for providing a predetermined exciting voltage;
a first switching means (24a) connected between said exciting coil (25) and said voltage regulator means (13) and controlled by a first signal, for applying said exciting voltage at selected polarity to said exciting coil (25);
a second switching means (24b) connected between said exciting coil (25) and said voltage regulator means (13) and controlled by a second signal, for applying said exciting voltage at another polarity to said exciting coil (25);
wherein said control means comprises
current detection means (Rs) connected in series between said first and second switching means and said exciting coil, for detecting exciting current (Io) flowing through said exciting coil (25);
absolute value circuit (31) connected to said current detecting means (Rs) for generating an absolute value of the exciting current (Io) detected by said current detection means (Rs):
means for generating a reference voltage;
difference operating means (32) connected to said absolute value circuit (31) for calculating the difference between said absolute value signal and said reference voltage at a predetermined value for determining a constant level of said exciting current (Io);
duty cycle conversion means (33) connected to said difference operating means (32) for converting the output of said difference operating means into a control signal (Sd) having a train of pulses having duty cycles related to said output of said difference operating means (32);
means for switching the reference voltage between a predetermined value of the reference voltage and a zero voltage;
means for generating a timing signal (S$_t$); and
arithmetic operating means (34) connected to said duty cycle conversion means (33), and responsive to said control signal (Sd) and said timing signal (St), for switching said exciting current at a predetermined frequency, said arithmetic operating means performing arithmetic operation to generate said first signal (Sf$_1$) and said second signal (Sf$_2$) related to said control signal and said timing signal, and for controlling said first and second switching means, respectively, by said first and said second signals;
and wherein said difference operating means comprises means for generating a tristate excitation by calculating the difference between an output corresponding to the absolute value of said exciting current and an output generated by switching the reference voltage and the zero voltage with a frequency twice as high as the exciting frequency.

2. An electromagnetic flowmeter comprising
a conduit (27);
a pair of electrodes (28a,28b) disposed in said conduit (27) at diametrically opposing positions;
an electromagnet disposed adjacent said conduit (27) and having an exciting coil (25) for generating a magnetic field within said conduit (27);
a driving means (13, etc) connected to said exciting coil (25) for exciting said electromagnet;

control means (30) connected to said driving means for controlling the driving means; and detecting means (29) connected to said electrodes in said conduit (27) for detecting a flow rate signal (Va) generated by a fluid flowing through said conduit;

wherein said driving means comprises a voltage regulator means (13) supplied with a DC voltage obtained by rectifying a voltage from an AC power source (10) having a predetermined frequency and applying a voltage control, for providing a predetermined exciting voltage;

a first switching means (24a) connected between said exciting coil (25) and said voltage regulator means (13) and controlled by a first signal, for applying said exciting voltage at selected polarity to said exciting coil (25);

a second switching means (24b) connected between said exciting coil (25) and said voltage regulator means (13) and controlled by a second signal, for applying said exciting voltage at another polarity to said exciting coil (25);

wherein said control means comprises current detection means (Rs) connected in series between said first and second switching means and said exciting coil, for detecting exciting current (Io) flowing through said exciting coil (25);

absolute value circuit (31) connected to said current detection means (Rs) for generating an absolute value of the exciting current (Io) detected by said current detection means (Rs);

means for generating a reference voltage (Es1);

difference operating means (32) connected to said absolute value circuit (31) for calculating the difference between said absolute value signal and said reference voltage (Es1) at a predetermined value for determining a constant level of said exciting current (Io);

duty cycle conversion means (33) connected to said difference operating means (32) for converting the output of said difference operating means into a control signal (Sd) having a train of pulses having duty cycles related to said output of said difference operating means (32);

means for generating a timing signal (St); and arithmetic operating means (34) connected to said duty cycle conversion means (33), and responsive to said control signal (Sd) and said timing signal (St), for switching said exciting current at a predetermined frequency, said arithmetic operating means performing arithmetic operation to generate said first signal (Sf1) and said second signal (Sf2) related to said control signal and said timing signal, and for controlling said first and second switching means, respectively, by said first and second signals;

and wherein said voltage regulator means comprises a transformer comprising primary and secondary windings, a rectifier and a Zener diode, and wherein AC voltage produced in the secondary winding of the transformer is rectified in the rectifier and then filtered by the Zener diode.

3. An electromagnetic flowmeter comprising
a conduit (27);
a pair of electrodes (28a, 28b) disposed at diametrically opposite positions in said conduit (27);

an electromagnet disposed adjacent said conduit (27) and having an exciting coil (25) for generating a magnetic field within said conduit (27);

a driving means (13, etc) for exciting said exciting coil (25) of said electromagnet;

detecting means (29) connected to said electrodes in said conduit (27) for detecting a flow rate signal (Va) generated by a fluid flowing through said conduit; and control means connected to said driving means for controlling the driving means;

wherein said control means comprises means for providing a timing signal ($S_t$);

current detection means (Rs) for detecting current (Io) flowing through said exciting coil (25);

absolute value circuit (35) connected to said current detection means (Rs) for generating an absolute value signal (eA) of the exciting current;

means for generating a reference voltage (Es1);

difference operating means (32) connected to said absolute value circuit (35) for calculating the difference between said absolute value signal (eA) and said reference voltage (Es1) at a predetermined value for determining a constant level of said exciting current (Io);

duty cycle conversion means (36) connected to said difference operating means (32) for converting the output from said difference operating means (32) into a control signal (eP) having a train of pulses having a duty cycle proportional to the output from said difference operating means; and arithmetic means (37) connected to said duty cycle conversion means (36) and responsive to said control signal (eP) and said timing signal (St), for switching said exciting current (Io) at a predetermined frequency, and for generating a first signal (Sf1) and a second signal (Sf2) related to said control signal (eP) and said timing signal (St) and for controlling first (SW1) and second (SW2) switching means by said first and second signals;

and wherein said driving means comprises a voltage regulation means (13) for producing a predetermined exciting voltage from a DC voltage obtained from an AC power source (10) having a predetermined frequency and being rectified by a rectifier (11) and subjected to voltage control;

said first switching means (SW1) connected between said exciting coil (25) and said voltage regulation means (13) and opened and closed by said first signal (Sf1) having a train of pulses with a duty cycle determined by the level of the exciting current corresponding to an exciting period and turned ON and OFF synchronous with the exciting period;

said second switching means (SW2) connected between said exciting coil (25) and said voltage regulation means (13) and opened and closed by said second signal (Sf2) having a phase corresponding to said exciting period opposite to that of said first signal;

a pair of diodes (26a, 26b) connected in parallel with said first (SW1) and second (SW2) switching means, respectively, with the polarity being opposite to the flowing direction of said exciting current;

first switching circuit (SW3) connected in parallel with said exciting coil (25) and rendered conductive during the ON period in which said train pulses rendered non-conductive during the OFF period of said first signal; and second switching circuit (SW4) connected in parallel with said exciting coil (25) and rendered conductive during the ON period in which said train of pulses of said second signal continues to turn ON and OFF, and being rendered non-conductive during the OFF period of said second signal.

4. The flowmeter of claim 3, wherein said voltage regulation means comprising means responsive to a reference voltage and a switching control signal, providing said exciting voltage corresponding to said reference voltage.

5. The flowmeter of claim 3, wherein said voltage regulation means comprises means for supplying a rectified DC voltage from said rectifier and generates said exciting voltage, and wherein said voltage regulation means further comprises a transformer for insulating said rectifier.

6. The flowmeter of claim 3, wherein said first and second switching means comprise field effect transistors, respectively.

7. The flowmeter of claim 5, wherein said transformer has winding used as power supply for said flowmeter.

8. The flowmeter of claim 3, wherein said first and second switching circuits comprise respectively serial circuits each comprising first and second field effect transistors and paired diodes connected in a direction inhibiting current due to said exciting voltage; and wherein said first and second field effect transistors are controlled by timing signals.

9. The flowmeter of claim 3, wherein said first and second switching circuits comprise first and second field effect transistors; wherein said first field effect transistor is controlled by means for providing a third control signal which is rendered conductive during the OFF period in the train of pulses of said first control signal; and wherein said second field effect transistor is controlled by means for providing a fourth control signal which is rendered conductive during the OFF period in the train of pulses of said second control signal.

10. An electromagnetic flowmeter comprising a conduit having a pair of electrodes disposed at diametrically opposing positions, an electromagnet having an exciting coil for generating a magnetic field within said conduit, a driving means for exciting said electromagnet, and means for outputting a flow rate signal generated by a fluid flowing through said conduit, wherein said driving means comprises A. a switching regulation means for stabilizing a supply voltage so that a circuit voltage is outputted and insulated from said supply voltage, and an exciting voltage is outputted according to a set voltage;

B. a first switching means connected between said exciting coil and said switching regulation means for applying said exciting voltage at one of two polarities to said exciting coil;

C. a second switching means connected between said exciting coil and said switching regulation means for applying said exciting voltage at the other of said polarities to said exciting coil;

D. a current detection means connected in series between said switching regulation means and said exciting coil for detecting an exciting current flowing through said exciting coil and for producing an output voltage;

means for supplying a reference voltage;
means for supplying a timing signal; and E. a switching control means for controlling said first and second switching means, said switching control means comprising means for computing the difference between the absolute value of the output voltage from said current detection means and the reference voltage, said difference used for determining the magnitude of said exciting current, means for producing a duty cycle signal corresponding to said difference, and means for obtaining the product of said duty cycle signal and the timing signal, said product used for switching said exciting current at a frequency which is lower than the frequency of the power supply.

11. The flowmeter of claim 10, wherein said first and second switching means comprise field effect transistors, respectively.

12. The flowmeter of claim 10, wherein said timing signal is prepared by frequency dividing the commercial power supply frequency through a frequency divider.

13. The flowmeter of claim 10, wherein further comprising means for switching the reference voltage and a zero voltage, and wherein said difference amplifier comprises means for computing and outputting the difference between the output corresponding to the absolute value of said exciting current and the output obtained by switching the reference voltage and the zero voltage with a frequency twice as high as the exciting frequency by using a changeover switch.

14. an electromagnetic flowmeter comprising a conduit having a pair of electrodes disposed at diametrically opposing positions, an electromagnet having an exciting coil for generating a magnetic field within said conduit, and a driving means for exciting said electromagnet, and means for outputting a flow rate signal generated by a fluid flowing through said conduit, wherein said driving means comprises A. a switching regulation means for stabilizing a supply voltage so that a circuit voltage is outputted and insulated from said supply voltage, and an exciting voltage is outputted according to a set voltage through a capacitor connected in parallel with an output end;

B. a current detection means for detecting an exciting current flowing through said exciting coil connected in series between said switching regulation means and said exciting coil;

C. a difference computing means for computing the difference between the absolute value of an output voltage detected by said current detection means and a reference voltage for determining the magnitude of said exciting current;

means for supplying said reference voltage;
means for supplying a duty cycle signal corresponding to said difference;

D. a computing means for receiving the duty cycle signal corresponding to said difference and the frequency of the power supply, and for computing and outputting timing signals corresponding to a positive exciting period during which positive exciting current is applied and a negative exciting period during which the negative exciting current is applied, a first control signal containing number of said duty cycle signals within its positive exciting period and having the OFF period corresponding to said negative exciting period, and a second control signal containing number of said duty cycle signals within its negative exciting period and having the OFF period corresponding to said positive exciting period;

E. a first switching means connected in series between said exciting coil and said switching regulation means and opened and closed by said first control signal;

F. a second switching means connected in series between said exciting coil and said switching regulation means and opened and closed by said second control signal;

G. a first switching circuit connected in parallel with said exciting coil, being rendered conductive during OFF periods contained by said positive exciting period of said first control signal, and being rendered non-conductive during said negative exciting period of said first control signal; and H. a second switching circuit connected in parallel with said exciting coil, being rendered conductive during OFF periods contained by said negative exciting period of said second control signal, and being rendered non-conductive during said positive exciting period of said second control signal.

15. The flowmeter of claim 14, wherein said first and second switching means comprise field effect transistors, respectively.

16. The flowmeter of claim 14, wherein said first and second switching circuits comprise respective serial circuits each composed of first and second field effect transistors and paired diodes connected in the direction of inhibiting the current due to said exciting voltage, and wherein said first and second field effect transistors are controlled by said timing signals, respectively.

17. The flowmeter of claim 14, wherein said first and second switching circuits comprises respective first and second field effect transistors; wherein said first field effect transistor is controlled by a third control signal, means for causing said third control signal to flow during the OFF periods in each train of pulses of said first control signal; and wherein said second field effect transistor is controlled by a fourth control signal means for causing said fourth control signal to flow during the OFF periods in each train of pulses of said second control signal.

* * * * *